United States Patent
Frazier et al.

(10) Patent No.: US 7,349,615 B2
(45) Date of Patent: Mar. 25, 2008

(54) FIBER OPTIC HOUSING ASSEMBLY FOR FIBER OPTIC CONNECTIONS COMPRISING PIVOTABLE PORTION

(75) Inventors: Brent M. Frazier, Haslet, TX (US); Raymond G. Jay, Arlington, TX (US); Danny McGranahan, Ft. Worth, TX (US); Craig A. Strause, Springtown, TX (US); Mark D. Appenzeller, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/510,312

(22) Filed: Aug. 25, 2006

(65) Prior Publication Data

US 2008/0050083 A1 Feb. 28, 2008

(51) Int. Cl.
*G02B 6/00* (2006.01)
(52) U.S. Cl. ..................................... 385/135
(58) Field of Classification Search ............ 385/53, 385/76–77, 88–89, 92, 134–137, 139–140, 385/147
See application file for complete search history.

(56) References Cited

U.S. PATENT DOCUMENTS

| | | | |
|---|---|---|---|
| 4,792,203 A | 12/1988 | Nelson et al. | 385/135 |
| 4,900,123 A | 2/1990 | Barlow et al. | 385/53 |
| 5,066,149 A | 11/1991 | Wheeler et al. | 385/135 |
| 5,071,211 A | 12/1991 | Debortoli et al. | 385/76 |
| 5,142,607 A * | 8/1992 | Petrotta et al. | 385/135 |
| 5,490,229 A | 2/1996 | Ghandeharizadeh et al. | 385/135 |
| 5,742,982 A | 4/1998 | Dodd et al. | 24/16 |
| 5,778,130 A | 7/1998 | Walters et al. | 385/134 |
| 5,825,962 A | 10/1998 | Walters et al. | 385/135 |
| 5,898,129 A * | 4/1999 | Ott et al. | 174/59 |
| 5,946,440 A | 8/1999 | Puetz | 385/135 |
| 5,987,207 A | 11/1999 | Hoke | 385/135 |
| 6,438,310 B1 | 8/2002 | Lance et al. | 385/135 |
| 6,504,988 B1 | 1/2003 | Trebesch et al. | 385/135 |
| 6,748,155 B2 | 6/2004 | Kim et al. | 385/135 |
| 6,944,389 B2 | 9/2005 | Giraud et al. | 385/135 |
| 2005/0237731 A1 | 10/2005 | Cowley et al. | 361/727 |

OTHER PUBLICATIONS

American Heritage Dictionary, 2$^{nd}$ College Edition, Boston: Houghton Mifflin Company, 1982 (No Month), p. 690.*

* cited by examiner

*Primary Examiner*—Quyen P Leung (57) ABSTRACT

There is provided a fiber optic housing assembly that includes a fiber optic interconnection portion and/or a splice portion. To provide the technician convenient access to the interconnection portion and/or the splice portion, the slidable shelf portion includes a pivotable portion that allows the interconnection portion and/or splice portion to be moved upwards or downwards, such as by pivoting about an axis. Therefore, the technician can preferably manipulate the fiber optic cables and/or connectors at an upper portion of the equipment rack without using a step ladder or similar device and at the lower portion of the equipment rack with greater comfort. The pivotable portion includes locks, latches, pins, and/or the like to prevent unintentional movement of the pivotable portion relative to the shelf portion and/or exterior portion of the housing assembly.

22 Claims, 8 Drawing Sheets

FIBER OPTIC HOUSING ASSEMBLY FOR FIBER OPTIC CONNECTIONS COMPRISING PIVOTABLE PORTION

BACKGROUND OF THE INVENTION

1. Field of the Invention

The present invention is related to fiber optic housing assemblies, and more particularly, to fiber optic housing assemblies adapted to provide technicians with convenient access to the internal portions of the housing assemblies.

2. Description of Related Art

Fiber optic housing assemblies are often used to provide connection points, slack storage, and other functionalities for fiber optic communications networks at various points in the networks. For example, housing assemblies are often used in the central office or at customer premises in equipment racks to modularly contain and provide the technicians access to fiber optic connections, such as cross-connects, splices, or the like, to splitter modules, and to other fiber optic hardware.

Figure 1:
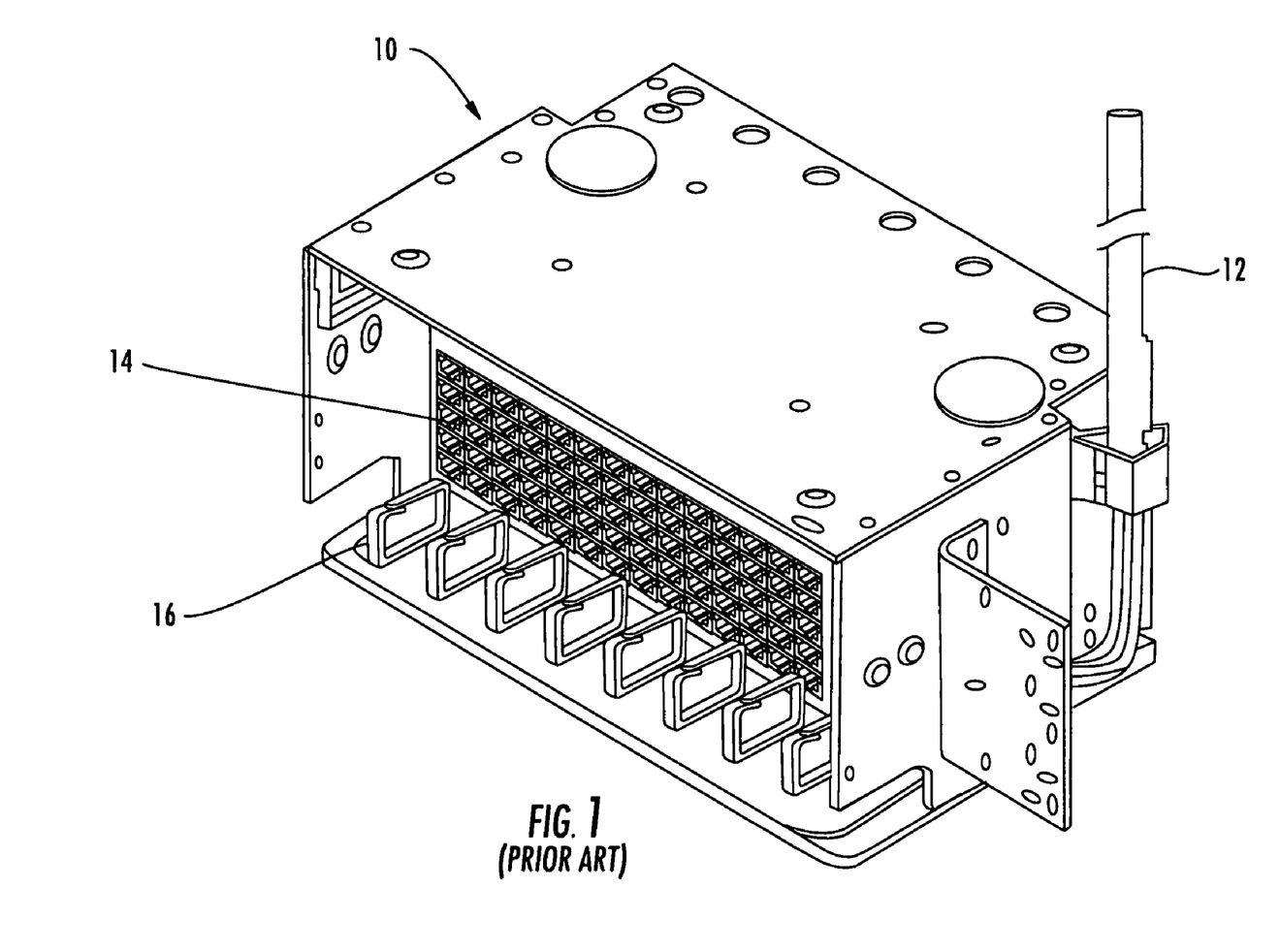
FIG. 1 is a right, front perspective view of a prior art fixed panel housing assembly comprising fixed interconnection portions and/or splice portions.
Figure 2:
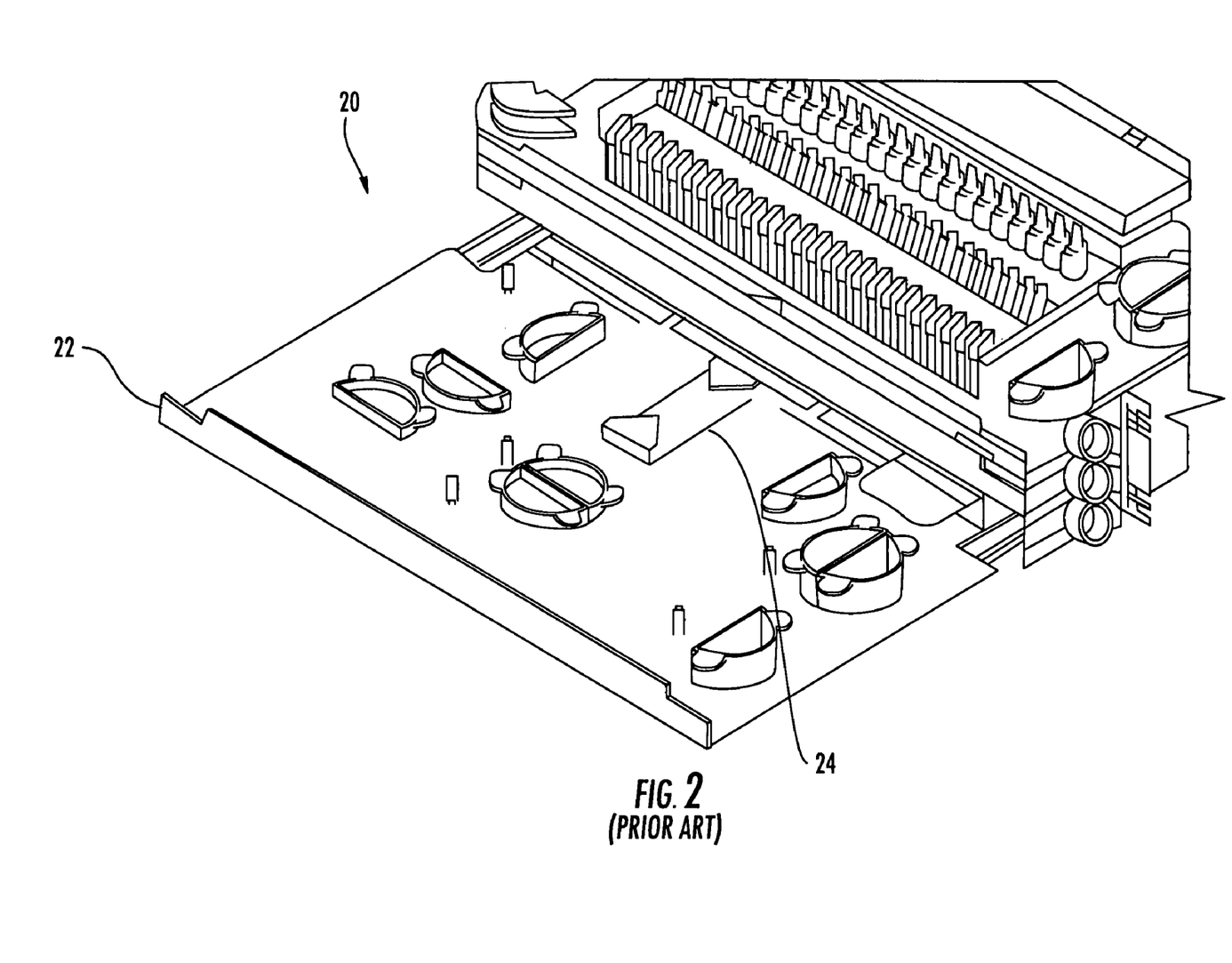
FIG. 2 is a right, front perspective view of a prior art slide-out shelf housing assembly comprising a horizontally-slideable shelf that includes a splice portion.

FIGS. 1 and 2 illustrate two prior art housing assemblies. FIG. 1 shows a housing assembly 10 into which fiber optic cables 12 enter and/or exit and are connected, spliced, or otherwise manipulated within the housing assembly. Housing assembly 10 includes an interconnection portion 14 and a splice portion 16; however, as the housing assembly defines a fixed panel housing assembly, in order for technicians to make fiber optic connections, fiber optic splices, or the like, the technician must walk around the equipment rack (not shown) to access the back of the fixed panel housing assembly thus complicating the technician's task and requiring additional technician time.

Turning now to FIG. 2, a second prior art housing assembly 20 is shown. The housing assembly 20 includes a slide-out shelf 22 that includes a splice portion 24 for receiving a splice assembly (not shown) and corresponding slack storage for the spliced fiber optic cables (not shown). Although the slide-out shelf 22 does provide improved access to the splice portion 24, such a splice portion would be difficult for a technician to access if the housing assembly 20 were positioned near the upper portion of the equipment rack. Indeed, technicians often are required to use step ladders to access such housing assemblies, thus requiring additional technician time and creating possible safety concerns. Similarly, when the housing assembly 20 is positioned near the lower portion of the equipment rack, the technician must stoop or sit on the ground to work with the splice portion 24 or other portions of the housing assembly, which may not be desirable to the technician.

Still further prior art housing assemblies include panels that swing outward about a vertical axis to provide a technician access to the front and back of the panel. However, these prior art housing assemblies fail to address the difficulty in accessing housing assemblies that are positioned relatively high and relatively low in an equipment rack. Therefore, a need exists for a fiber optic housing assembly that provides convenient access to the various portions therein regardless of the vertical position of the housing assembly in the equipment rack.

BRIEF SUMMARY OF THE INVENTION

The invention addresses the above needs and achieves other advantages by providing a housing assembly that includes a pivotable portion that may be moved upwards and/or downwards to improve technician access to the fiber optic portions of the housing assembly. More specifically, the housing assemblies of some embodiments of the present invention provide a shelf portion that moves relative to the exterior portion of the housing assembly, such as in a front-to-back direction. Once the shelf portion is substantially in an open position, the technician can selectively raise or lower a pivotable portion as desired. The pivotable portion of various embodiments of the invention includes an interconnection portion, a splice portion, and/or other portions that the technician may need to access. For example, the pivotable portion may be pivoted downward when the housing assembly is positioned in a relatively high position in the equipment rack to provide access to the interconnection portion, a splice portion, and/or other portions without the need for a stepladder or the like. Similarly, the pivotable portion may be pivoted upward when the housing assembly is positioned in a relatively low position in the equipment rack to provide access to the interconnection portion, a splice portion, and/or other portions without the need for the technician to stoop as low or to sit on the ground. Furthermore, additional features are provided in various embodiments of the present invention for improved functionality and safety.

One embodiment of the present invention comprises a fiber optic housing assembly including a fiber optic interconnection portion and/or a fiber optic splice portion. The housing assembly is adapted to be selectively attached to an equipment rack and includes an exterior portion for selective attachment of the housing assembly to the equipment rack. The housing assembly also includes a shelf portion adapted to selectively move relative to the exterior portion of the housing assembly, such as in a front-to-back direction. Joined to the shelf portion is a pivotable portion adapted to selectively pivot relative to the shelf portion. The fiber optic interconnection portion and/or the fiber optic splice portion is joined to the pivotable portion such that pivoting of the pivotable portion enables the technician to achieve convenient access to the interconnection portion and/or the splice portion. The pivotable portion of some embodiments of the present invention may be pivoted upwardly and/or downwardly relative to the shelf portion, and still further embodiments include pivotable portions with a top portion and bottom portion for convenient access to both the interconnection portion and/or the splice portion.

Further embodiments of the present invention provide methods for accessing a fiber optic interconnection portion and/or a fiber optic splice portion in a housing assembly. The shelf portion is moved relative to the exterior portion of the housing assembly, preferably to a position where the pivotable portion may be pivoted. The pivotable portion may be locked relative to the shelf portion, such that unlocking the pivotable portion allows it to be moved relative to the shelf portion, for example by pivoting the pivotable portion about an axis. As the interconnection portion and/or the splice portion is preferably joined to the pivotable portion, the technician may therefore have more convenient access to the fiber optic hardware. Therefore, the present invention enables technicians to service the fiber optic hardware more quickly, more safely, and more comfortably than prior art housing assemblies.

BRIEF DESCRIPTION OF THE SEVERAL VIEWS OF THE DRAWINGS

Having thus described the invention in general terms, reference will now be made to the accompanying drawings, which are not necessarily drawn to scale and are meant to be illustrative and not limiting, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing convenient access to fiber optic equipment are described and shown in the accompanying drawings with regard to a specific type of housing assembly, it is envisioned that the functionality of the various apparatus and methods may be applied to any now known or hereafter devised housing assemblies in which it is desired to provide convenient access to fiber optic equipment. Like numbers refer to like elements throughout.

With reference to FIGS. 3-8, a housing assembly 30 in accordance with one embodiment of the present invention is illustrated. The housing assembly 30 of the illustrated embodiment is intended to be used in a central office equipment rack and/or a customer premises equipment rack in an environmentally controlled setting. However, further embodiments of the present invention comprise housing assemblies for use in other environmentally controlled settings, in outside plant applications with or without environmental control, such as in fiber distribution hubs, multiple dwelling unit stations, or the like to provide non-limiting examples, or in any other fiber optic network application in which it is advantageous to use housing assemblies. Furthermore, the fiber optic housing assemblies of the embodiments described herein include fiber optic interconnection portions and/or fiber optic splice portions; however, further embodiments of the present invention include additional and/or alternative fiber optic portions such as splitter portions to list one non-limiting example.

Figure 3:
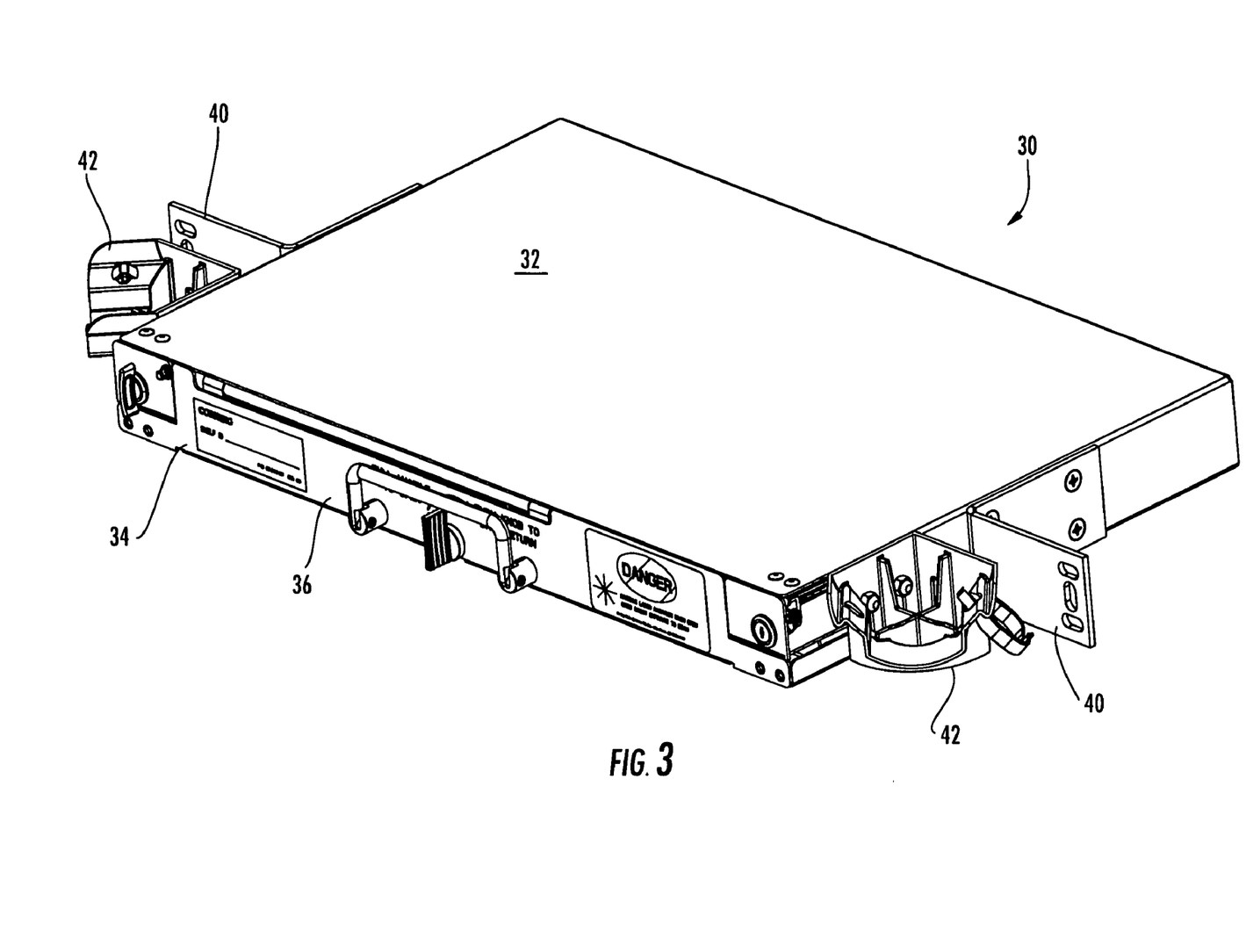
FIG. 3 is a right, front perspective view of a housing assembly in accordance with a first embodiment of the present invention, illustrating the shelf portion in the closed position relative to the exterior portion.

Turning now to the fiber optic housing assembly 30 of FIG. 3, the housing assembly comprises an exterior portion 32 adapted for selective attachment to an equipment rack (not shown). The exterior portion 32 of the illustrated embodiment of the present invention comprises top and bottom surfaces that are generally opposed and left, back, and right surfaces disposed between the top and bottom surfaces. The exterior portion 32 defines a generally open front surface through which the shelf portion 34 is selectively accessible and such that a front panel 36 (which defines a front surface of the housing assembly) of the shelf portion and/or pivotable portion 38 enables the exterior portion to generally enclose the interconnection portion and/or splice portion when the shelf portion defines a close position, such as in FIG. 3. The shelf portion 34 is illustrated in the open position in FIGS. 4-8. The exterior portion 32 generally encloses the interconnection portion and/or splice portion in order to protect them from unintentional damage and for orderly fiber management. In some embodiments of the present invention, the exterior portion hermetically seals the interior of the housing assembly when the shelf portion is in the closed position; however, the housing assembly 30 of the illustrated embodiment is not hermetically sealed when the shelf portion is in the closed position.

The exterior portion 32 of the housing assembly 30 is adapted to be selectively attached to an equipment rack, such as an equipment rack defining an interior width of 19 inches or 23 inches, to provide two non-limiting examples of equipment rack dimensions. The exterior portion 32 comprises one or more mounting brackets 40 adapted to connect a left side and/or right side of the exterior portion to the equipment rack by conventional fasteners; however, further embodiments of the present invention comprise alternative devices and design to selectively or permanently attach the housing assembly to an equipment rack or similar structure. The housing assembly 30 of FIG. 3 is intended to be installed with one or more other housing assemblies in an equipment rack in a generally vertical fashion, and accordingly the housing assembly defines a relatively low height, such as a height of 1.75 inches for the illustrated embodiments, to allow a preferred number of housing assemblies to be installed in an equipment rack to minimize the height and/or volume of the fiber optic system. Still further embodiments of the present invention comprises housing assemblies with alternatively shaped and sized exterior portions adapted for the particular requirements of the fiber optic system. The exterior portion 32 of FIG. 3 further comprises a fiber routing guide 42 mounted to both the left and right sides of the exterior portion to protect and/or organize the fibers entering and exiting the housing assembly.

Figure 4:
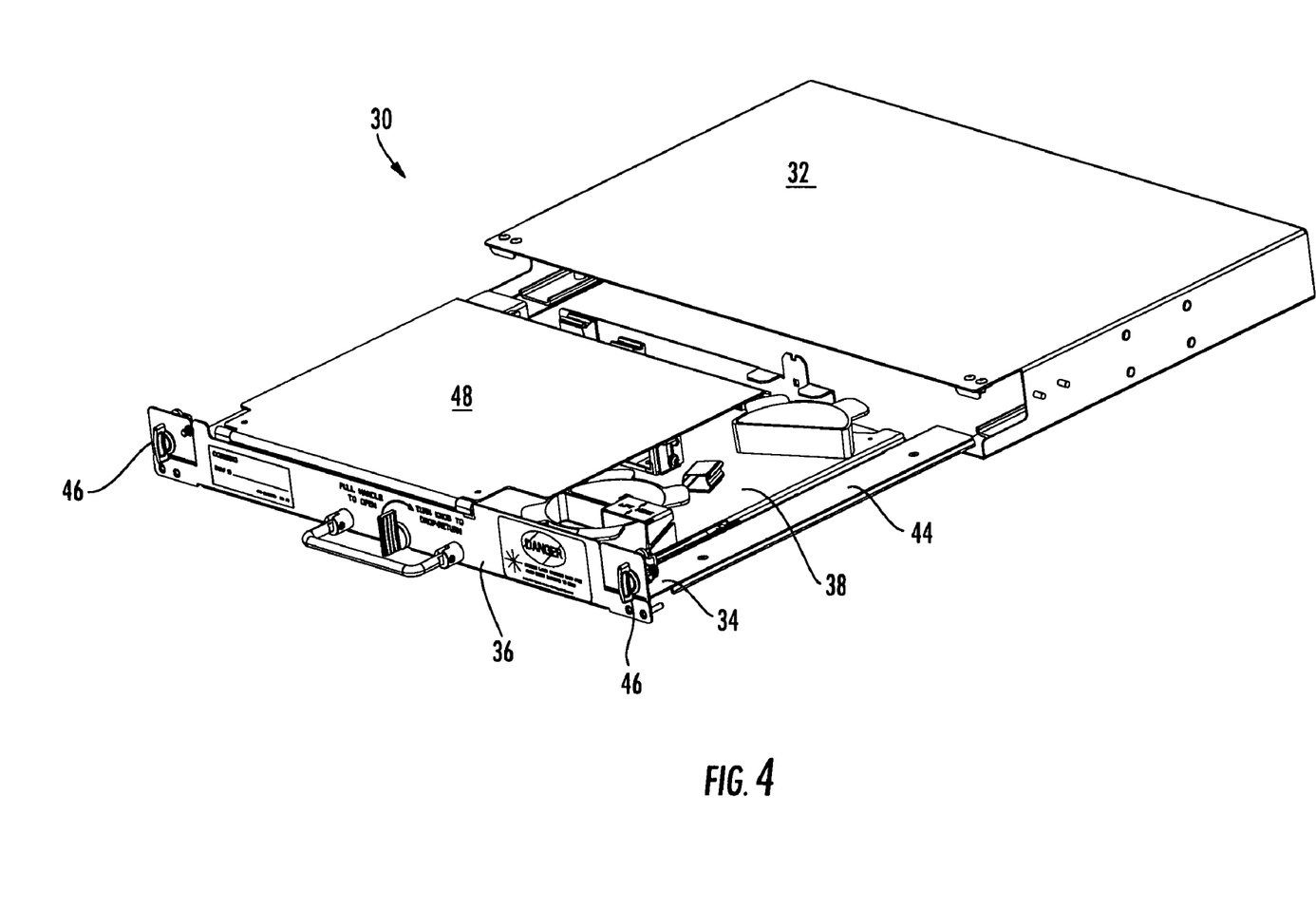
FIG. 4 is a right, front perspective view of the housing assembly of FIG. 1, illustrating the shelf portion in an opened position relative to the exterior portion and pivotable portion in a locked position relative to the shelf portion.

Turning now to the shelf portion 34 illustrated in FIG. 4, the shelf portion is adapted to selectively move in a first direction relative to the exterior portion 32 of the housing assembly 30. The first direction in FIG. 4 is generally aligned in a front-to-back direction relative to the equipment rack (not shown) to which the housing assembly 30 is mounted; however, further embodiments of the present invention comprise shelf portions that are adapted to selectively move in any direction relative to the exterior portion and or equipment rack. The shelf portion 34 of FIG. 4 comprises a rail device 44 on both the left and right sides of the shelf portion that engage mating rail devices on the inside of the exterior surface. The rail devices 44 may be oriented horizontally as shown in the illustrated embodiment or may be oriented vertically, or may be any combination thereof or may comprise circular or other shaped or positioned devices to allow the shelf portion 34 to move in a first direction relative to the exterior portion 32 of the housing assembly 30.

The shelf portion 34 of the illustrated embodiment includes one or more latch devices 46 to selectively retain the shelf portion 34 within the exterior portion 32 in a closed position. As shown in FIGS. 3 and 4, both the left and right side of the shelf portion 34 comprises a latch device 46, which comprises a winged tab that may be selectively rotated by a technician, a cylinder for receiving a key, or the like, wherein the latch device selectively engages and disengages a mating surface of the exterior portion 32 to selectively lock and unlock the shelf portion relative to the exterior portion. The housing assembly 30 of the illustrated embodiment comprises one or more latch devices 46 that provide enough retention to enable the housing assembly to conform to current Zone 4 geographic region earthquake test requirements. Further embodiments of the present invention include alternative latching devices, or no latching devices at all, to selectively retain the shelf portion relative to the exterior portion of the housing assembly.

Figure 5:
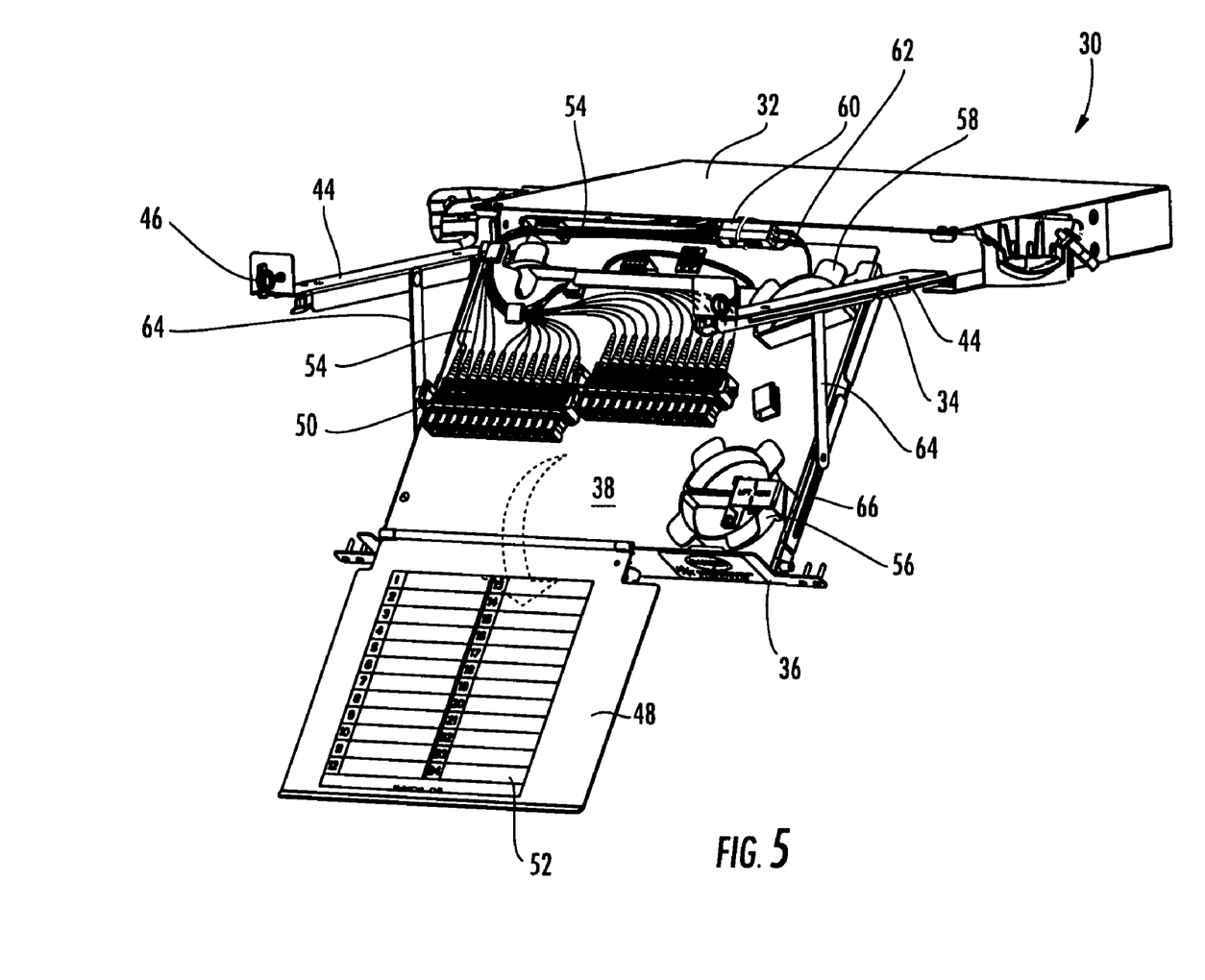
FIG. 5 is a right, front perspective view of the housing assembly of FIG. 1, illustrating the pivotable portion selectively pivoted relative to the shelf portion and a top cover rotated outwardly to expose the interconnection portion and a reference chart.

Joined to the shelf portion 34 is a pivotable portion 38 that is adapted to selectively pivot in a second direction relative to the shelf portion. Whereas the first direction for the illustrated embodiment is generally aligned in a front-to-back direction relative to the equipment rack, the second direction in which the pivotable portion 38 selectively pivots is preferably in a generally upward and/or downward direction relative to the shelf portion 34 and is more preferably about a single axis such that the second direction is a generally rotational direction relative to the shelf portion. Further embodiments of the present invention comprise alternative pivotable portions that selectively pivot in alternative directions or combinations of multiple directions and/or about one or more axes. For example, the pivotable portion of some embodiments moves generally orthogonally relative to the shelf portion. Referring now to FIG. 5, the pivotable portion 38 is shown rotated downwardly relative to the shelf portion 34 and is shown with a top cover 48 rotated outwardly to expose the interconnection portion 50 on the pivotable portion and a reference chart 52 on the top cover. The top cover 48 is preferably included to provide protection for the interconnection portion 50 and/or the fibers 54 passing into and out of the interconnection portion. The reference chart 52 is preferably provided on the top cover 48 to allow the technician to provide and review information about one or more of the connections in the interconnection portion 50. However, further embodiments of the present invention comprise pivotable portions with alternative top covers and/or reference charts or with no top cover or reference chart.

The interconnection portion 50 of the illustrated embodiment comprises two arrays comprising twelve adapters each, wherein the adapter is configured to optically connect two fiber optic connectors, such as in a cross-connect or other interconnection portions known in the art. FIG. 5 illustrates the input fibers 54 that are optically connected to the central office or other signal originating device and routed about various retainers before being connected to the interconnection portion 50; however, FIG. 5 does not show the output fibers optically connected to customer premises (or intended to be subsequently connected to customer premises) and intended to optically connected to the interconnection portion opposite the input fibers. Slack storage hubs 56 and 58 are shown in FIG. 5 to provide routing of the output fibers once installed to provide sufficient slack for technicians to connect the output fibers and to maintain the minimum bend radius of the fibers. Additional clips and other fiber retainers are provided to selectively retain the fibers. Pivotable portions of further embodiments of the present invention comprise alternative interconnection portions and may or may not comprise slack storage hubs as required by the specific application of the housing assembly.

Also provided on the pivotable portion 38 of FIG. 5 is one or more optical connector 60 into which one or more fibers 62 are optically connected to the input fibers 54. The optical connectors 60 of FIG. 5 are preferably fan-out connectors into which a ribbon fiber or similar cable of multiple fibers is divided into multiple individual fibers for selective connection of the individual fibers, pair of fibers, or the like. The fibers 62 are optically connected to the fiber optic splice portion as discussed more fully below. Further embodiments of the present invention comprise pivotable portions with alternative connectors for optically connecting the various fibers and/or may comprise no connector at all, for example, in the case of an interconnection portion that receives a ribbon cable or the like and is adapted to receive one or more individual fiber cables opposite the interconnection portion.

The pivotable portion 38 of FIG. 5 is selectively pivotable about one or pins or similar devices (not shown) that define an axis near the back of the shelf portion 34, such that the pivotable portion pivots relative to the rail devices 44 of the shelf portion 34. One or more first linkages 64 are provided proximate the middle of the shelf portion 34 to allow the pivotable portion 38 to pivot downward a predetermined distance and to retain the pivotable portion in a relatively fixed position relative to the shelf portion to allow the technician to conveniently work with the various components and/or fibers included on the pivotable portion. The pivotable portion 34 comprises one or more slots 66 corresponding to one end of the first linkage 64 to allow the first linkage to travel a predetermined distance. In addition, the one or more linkages 64 of the illustrated embodiment enable the pivotable portion 38 to remain in a generally horizontal fashion after being unlocked from the shelf portion 34 by a technician, such that the pivotable portion can be lowered as desired by the technician as opposed to unintentionally dropping after being unlocked. Still further embodiments of the present inventions provided alternative devices for enabling the pivotable portion to selectively pivot relative to the shelf portion.

Figure 6:
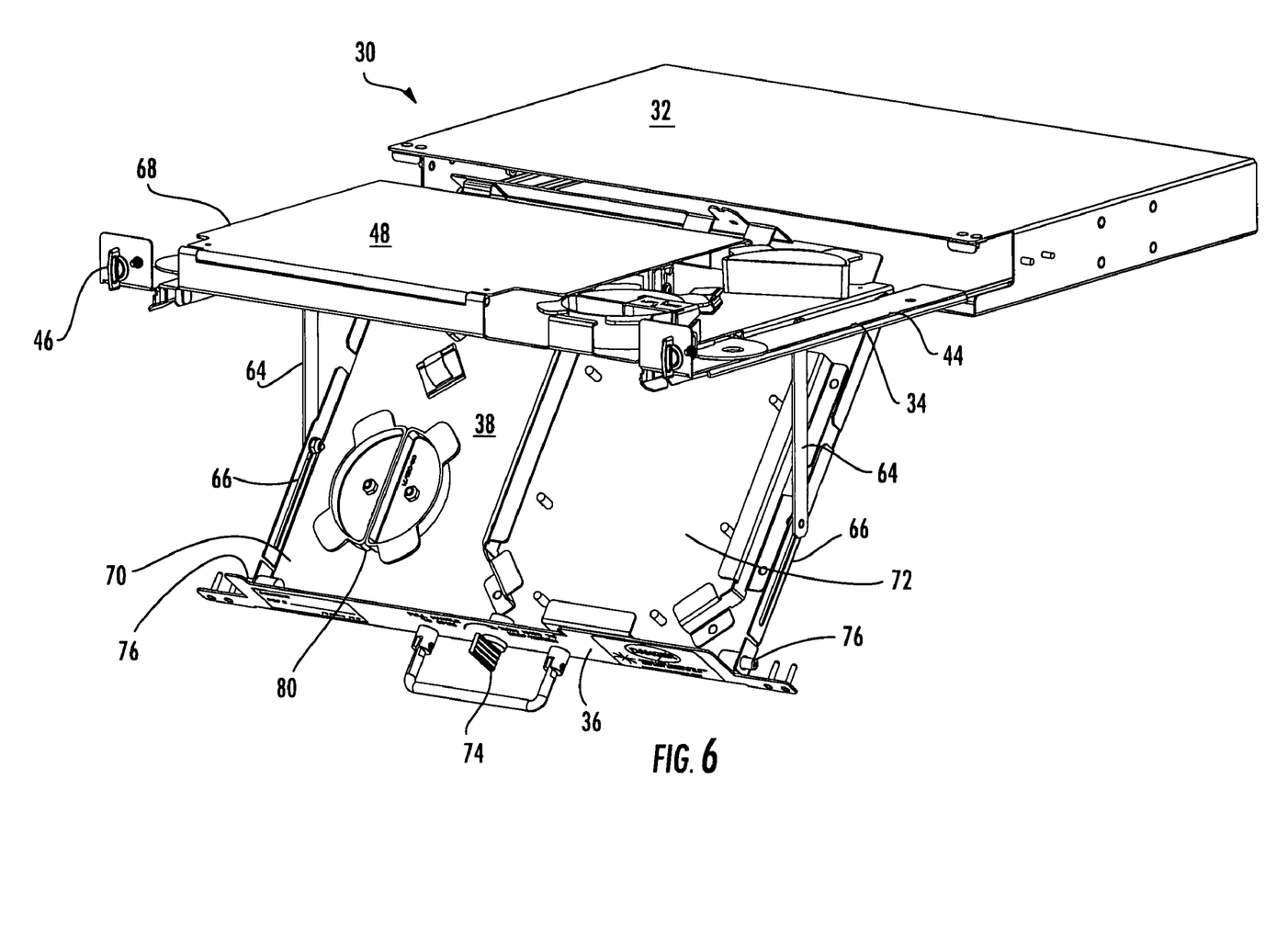
FIG. 6 is a right, front perspective view of the housing assembly of FIG. 1, illustrating a bottom portion of the pivotable portion selectively pivoted in a generally downward direction to expose a splice portion without a splice assembly.

Turning now to FIG. 6, the pivotable portion 38 defines a top portion 68 and a bottom portion 70, wherein at least one of the fiber optic interconnection portion 50 and the fiber optic splice portion 72 is joined to the top portion and the other is joined to the bottom portion. For the illustrated embodiment, the interconnection portion 50 is joined to the top portion and the splice portion 72 is joined to the bottom portion, however, further embodiments include the portions in reverse constructions. The top portion 68 of the pivotable portion 38 of FIG. 6 is adapted to selectively pivot in a second direction or generally upward direction relative to the shelf portion 34, and the bottom portion 70 is adapted to selectively pivot in a third direction or generally downward direction relative to the shelf portion. Further embodiments of the present invention include top and bottom portions that pivot in alternative orthogonal, lateral, and/or rotational directions.

As best illustrated in FIG. 6, the pivotable portion 38 comprises a latch portion 74 for selectively locking the pivotable portion relative to the shelf portion 34. The latch portion 74 enables the pivotable portion 38 to be removed from the exterior portion 32 in a relatively fixed position relative to the shelf portion 34 and to prevent the pivotable portion from unintentionally pivoting downward or in other directions. The latch portion 74 of the illustrated embodiment is mechanically connected to one or more pins 76 such that rotation of the latch portion 74 linearly moves the one or more pins to selectively engage or disengage the shelf portion to accordingly allow the pivotable portion to pivot relative to the shelf portion. Alternative embodiments of the housing assembly of the present invention include alternative latch portions or no latch portion.

Figure 7:
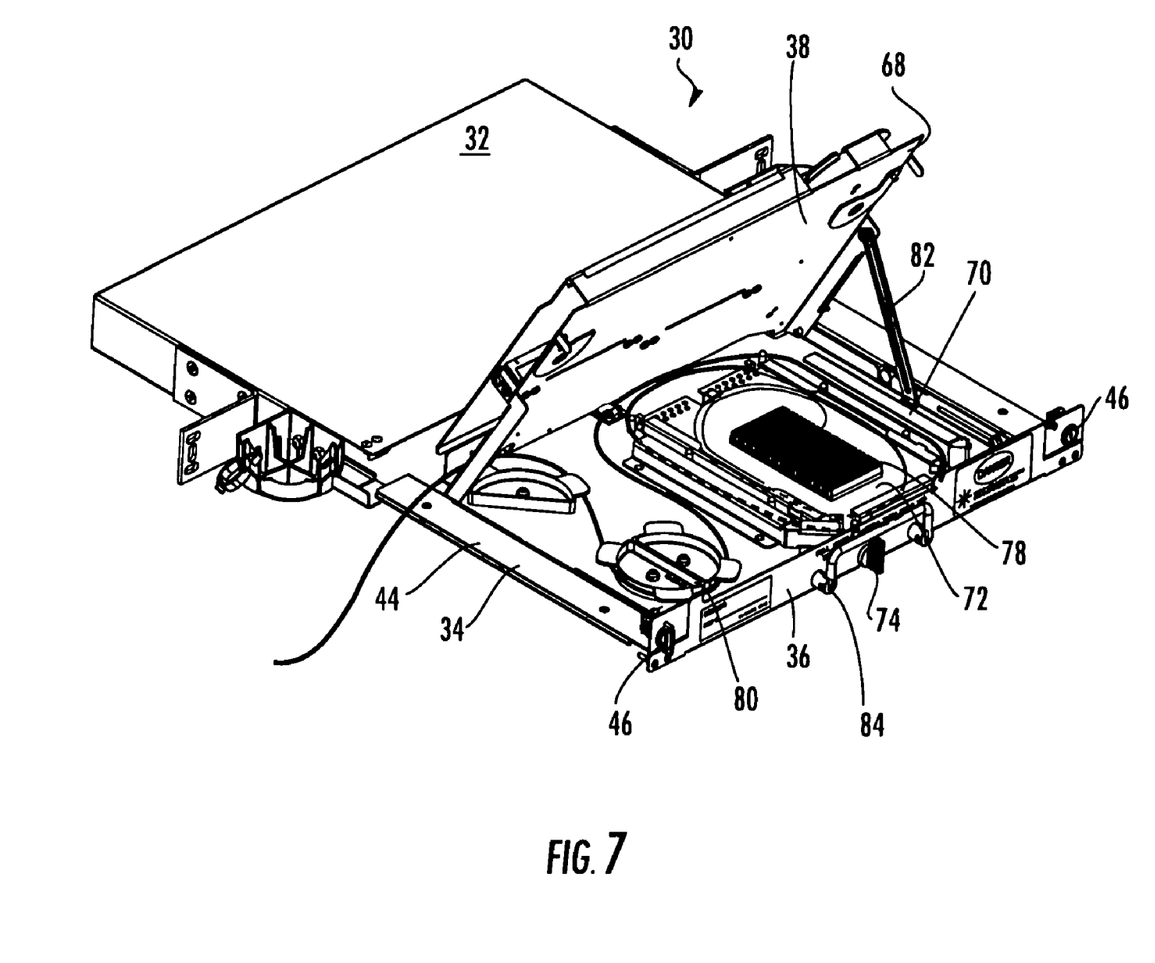
FIG. 7 is a left, front perspective view of the housing assembly of FIG. 1, illustrating a top portion of the pivotable portion selectively pivoted in a generally upward direction to expose a splice portion with a splice assembly.

Turning now to the splice portion 72 joined to the pivotable portion 38, as shown in FIGS. 6 and 7, the splice portion 72 is joined to the bottom portion 70 of the pivotable portion. FIG. 6 illustrates the splice portion 72 without a splice assembly, whereas FIG. 7 illustrates the splice assembly 78 included in the splice portion. The splice assembly 78 is shown with fibers entering into the housing assembly 30 and being routed about slack storage hubs 80 and other fiber retainers to provide the technician with sufficient fiber slack to perform the splice operation. The fiber entering the housing assembly is preferably spliced to the fiber 62 that is optically connected to the interconnection portion 50 as discussed above.

FIG. 7 also shows the top portion 68 of the pivotable portion 38 selectively pivoted in a generally upward direction relative to the shelf portion 34 such that the technician is able to conveniently access the splice portion 72. The top portion 68 includes one or more second linkages 82 provided proximate the middle of the shelf portion 34 and/or pivotable portion 38 to allow the top portion 68 to pivot upward a predetermined distance and to retain the pivotable portion in a relatively fixed position relative to the shelf portion and/or bottom portion 70 to allow the technician to conveniently work with the various components and/or fibers included on the bottom portion. The pivotable portion 34 comprises one or more slots corresponding to one end of the second linkage 82 to allow the second linkage to travel a predetermined distance. Still further embodiments of the present inventions provided alternative devices for enabling the top portion to selectively pivot relative to the shelf portion and/or bottom portion.

The front panel 36 of the pivotable portion 38 of the illustrated embodiment comprises a low profile handle 84 on a front surface of the housing assembly. The handle 84 is attached to the front surface at two points and is able to swing about the two points that are preferably axially aligned. The handle 84 rests in generally upward direction, as shown in FIG. 3, such that the handle defines a low profile; however, the handle is also capable of swinging outwardly to enable the technician to better grasp the handle to selectively move the shelf portion and/or pivotable portion. The handle 84 is illustrated in the outward position in FIGS. 4, 6, and 8. Further embodiments of the present invention include alternative low profile handles, such as recessed handles to provide one non-limiting example.

Figure 8:
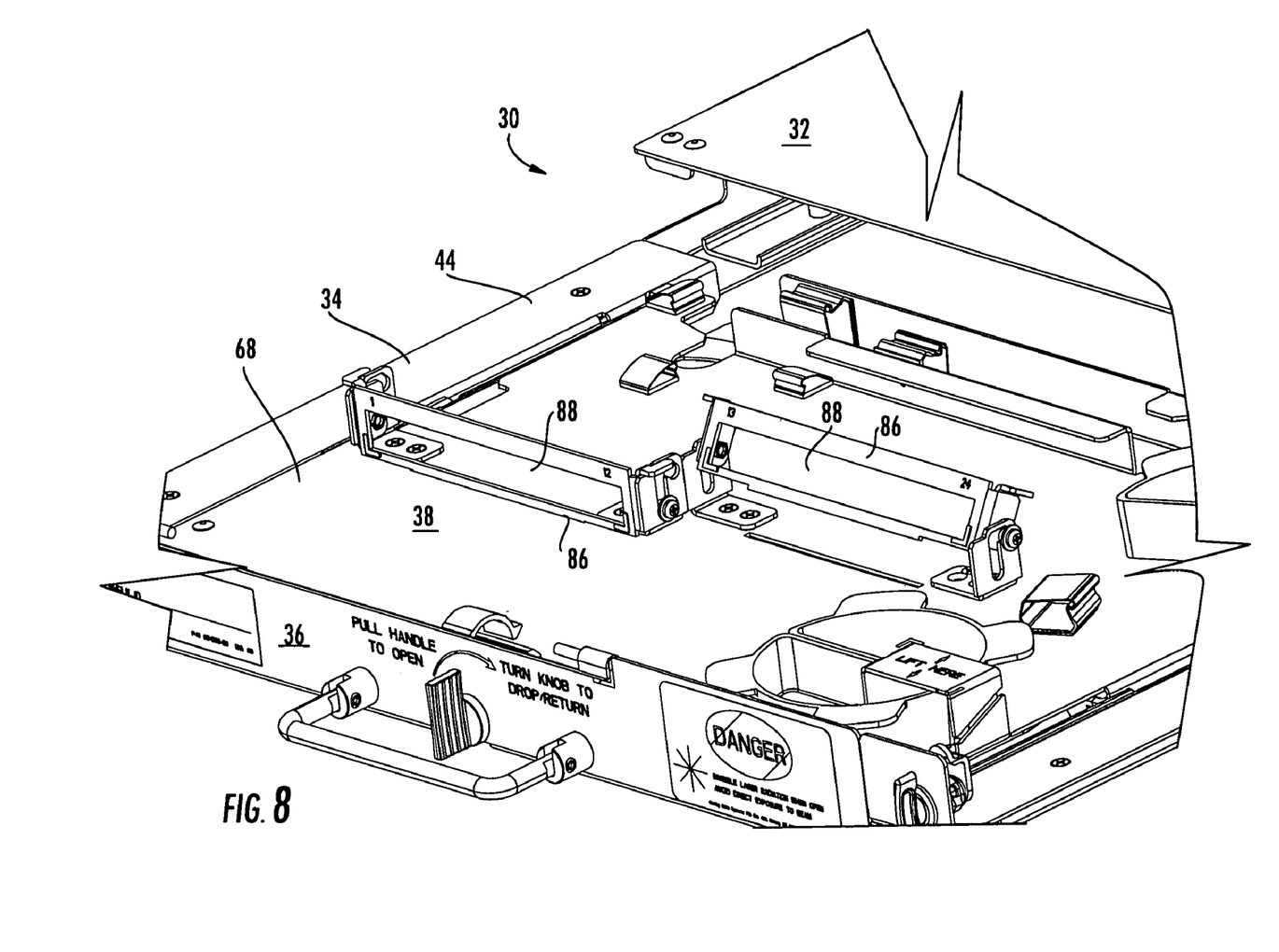
FIG. 8 is an enlarged right, front perspective view of the housing assembly of FIG. 1, illustrating the pivotable portion with the top cover and interconnection adapters removed to show the multipositional panels for mounting of the adapters of the interconnection portion.

The fiber optic interconnection portion 50 of the illustrated embodiment comprises one or more multipositional panels 86 for selective mounting of one or more adapters. FIG. 8 provides an enlarged view of the multipositional panels 86 of the interconnection portion 50, with one multipositional panel in a lower position in contact with and generally parallel to the pivotable portion 38 and with the other multipositional panel in an upright position such that it is not in contact and generally angled relative to the pivotable portion. The multipositional panel 86 includes a channel portion to allow the technician to selective raise the multipositional panel relative to the channel portion and reposition the multipositional panel from the lower position to the upright position or vice versa. Alternative embodiments of the present invention include alternative multipositional panels having alternative shapes and/or components to allow movement of the interconnection portion relative to the pivotable portion. Still further embodiments of the present invention comprise no multipositional panels at all. The multipositional panel 86 of FIG. 8 also comprises an opening 88 adapted to receive one or more adapters of the interconnection portion 50. The multipositional panel 86 is adapted for selective movement relative to the pivotable portion 50 when the multipositional panel includes no adapters or one or more adapters.

The housing assembly 30 of the present invention provides a technician convenient and effective access to the fiber optic portions within the housing assembly. Methods for accessing a fiber optic interconnection portion 50 and a fiber optic splice portion 72 are provided by the present invention. The technician moves the shelf portion 34 of the housing assembly 30 in a first direction, such as a front-to-back direction, relative to an exterior portion 32 of the housing assembly. Once the shelf portion 34 is substantially outside the exterior portion 32, the technician pivots the pivoting portion 38 that is joined to the shelf portion 34 in a second direction, such as in a rotational direction about a single axis to provide one non-limiting example of a second direction, relative to the shelf portion. The interconnection portion 50 and/or the splice portion 72 are joined to the pivotable portion 38 such that the technician can conveniently access the interconnection portion and/or the splice portion after pivoting the pivotable portion. Further embodiments of the present invention comprise alternative and additional methods for accessing fiber optic portions of the housing assembly.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The invention claimed is:

1. A fiber optic housing assembly including at least one of a fiber optic interconnection portion and a fiber optic splice portion wherein the housing assembly is adapted to be selectively attached to an equipment rack, the housing assembly comprising:

an exterior portion adapted for selective attachment to the equipment rack;

a shelf portion adapted to selectively move in a first direction relative to the exterior portion of the housing assembly; and a pivotable portion joined to the shelf portion and adapted to selectively pivot in a second direction relative to the shelf portion, wherein the second direction is different than the first direction;

wherein at least one of the fiber optic interconnection portion and the fiber optic splice portion is joined to the pivotable portion such that the at least one of the fiber optic interconnection portion and the fiber optic splice portion pivots relative to the exterior portion when the pivotable portion is selectively pivoted relative to the shelf portion.

2. A housing assembly according to claim 1, wherein the exterior portion generally encloses the shelf portion and pivotable portion when the shelf portion defines a close position.

3. A housing assembly according to claim 1, wherein the shelf portion is selectively moveable in a first direction that is generally aligned in a front-to-back direction relative to the equipment rack.

4. A housing assembly according to claim 1, wherein the pivotable portion moves in a second direction that is a generally downward direction relative to the shelf portion.

5. A housing assembly according to claim 1, wherein the pivotable portion moves in a second direction that is a generally upward direction relative to the shelf portion.

6. A housing assembly according to claim 1, wherein the pivotable portion generally moves about a single axis such that the second direction is a generally rotational direction relative to the shelf portion.

7. A housing assembly according to claim 1, wherein the pivotable portion defines a top portion and a bottom portion, and wherein at least one of the fiber optic interconnection portion and the fiber optic splice portion is joined to the top portion and the other of the fiber optic interconnection portion and the fiber optic splice portion is joined to the bottom portion.

8. A housing assembly according to claim 7, wherein the top portion of the pivotable portion is adapted to selectively pivot in a generally upward direction relative to the shelf portion.

9. A housing assembly according to claim 7, wherein the bottom portion of the pivotable portion is adapted to selectively pivot in a generally downward direction relative to the shelf portion.

10. A housing assembly according to claim 1, further comprising fiber routing and slack storage devices on at least one of the pivotable portion and the exterior portion.

11. A housing assembly according to claim 1, wherein at least one of the shelf portion and the pivotable portion comprises a low profile handle on a front surface of the housing assembly.

12. A housing assembly according to claim 1, wherein the pivotable portion comprises a latch portion for selective locking of the pivotable portion relative to the shelf portion.

13. A housing assembly according to claim 1, wherein the fiber optic interconnection portion is joined to the pivotable portion and the fiber optic interconnection portion comprises at least one multipositional panel for selective mounting of one or more adapters.

14. A fiber optic housing assembly including a fiber optic interconnection portion and a fiber optic splice portion, the housing assembly comprising:

an exterior portion;

a shelf portion adapted to selectively move in a first direction relative to the exterior portion of the housing assembly; and a pivotable portion joined to the shelf portion and comprising:

a top portion, wherein at least one of the fiber optic interconnection portion and the fiber optic splice portion is joined to the top portion; and a bottom portion, wherein at least one of the fiber optic interconnection portion and the fiber optic splice portion is joined to the bottom portion;

wherein at least one of the top portion and bottom portion of the pivotable portion is adapted to selectively pivot in a second direction relative to the shelf portion, wherein the second direction is different than the first direction.

15. A housing assembly according to claim 14, wherein the top portion of the pivotable portion is adapted to selectively pivot in a second direction relative to the shelf portion and the bottom portion is adapted to selectively pivot in a third direction relative to the shelf portion, wherein the third direction is different than the first direction and the second direction.

16. A housing assembly according to claim 14, wherein the top portion of the pivotable portion is adapted to selectively pivot in a generally upward direction relative to the shelf portion and the bottom portion of the pivotable portion is adapted to selectively pivot in a generally downward direction relative to the shelf portion.

17. A housing assembly according to claim 14, wherein the top portion of the pivotable portion and the bottom portion of the pivotable portion generally move about a single axis such that the second direction is a generally rotational direction relative to the shelf portion.

18. A housing assembly according to claim 14, wherein the fiber optic interconnection portion is joined to the top portion of the pivotable portion and the fiber optic interconnection portion and is joined to the bottom portion of the pivotable portion.

19. A housing assembly according to claim 14, wherein the fiber optic interconnection portion is joined to at least one of the top portion and the bottom portion of the pivotable portion and the fiber optic interconnection portion comprises at least one multipositional panel for selective mounting of one or more adapters.

20. A method of accessing at least one of a fiber optic interconnection portion and a fiber optic splice portion in a housing assembly selectively attached to an equipment rack, the method comprising:

moving a shelf portion of the housing assembly in a first direction relative to an exterior portion of the housing assembly; and pivoting a pivotable portion joined to the shelf portion in a second direction relative to the shelf portion, wherein the second direction is different than the first direction;

wherein at least one of the fiber optic interconnection portion and the fiber optic splice portion is joined to the pivotable portion such that the at least one of the fiber optic interconnection portion and the fiber optic splice portion pivots relative to the exterior portion when the pivotable portion is pivoted relative to the shelf portion.

21. A method according to claim 20, wherein pivoting the pivotable portion in a second direction relative to the shelf portion comprises pivoting the pivotable portion about a single axis such that the second direction is a generally rotational direction relative to the shelf portion.

22. A method according to claim 21, further comprising unlocking the pivotable portion relative to the shelf portion prior to pivoting the pivotable portion.

* * * * *